US012580952B2

(12) United States Patent
Karampournis et al.

(10) Patent No.: US 12,580,952 B2
(45) Date of Patent: Mar. 17, 2026

(54) SYSTEMS AND METHODS FOR DETECTING ADVANCED USERS BY DETECTION OF THE USE OF MULTIPLE WINDOWS OR TABS

(71) Applicant: LEXISNEXIS RISK SOLUTIONS FL INC., Boca Raton, FL (US)

(72) Inventors: Raphaël Karampournis, Råneå (SE); Per Burström, Luleå (SE); Mattias Wallbing, Luleå (SE); David Eriksson, Luleå (SE)

(73) Assignee: LexisNexis Risk Solutions FL Inc., Boca Raton, FL (US)

( * ) Notice: Subject to any disclaimer, the term of this patent is extended or adjusted under 35 U.S.C. 154(b) by 208 days.

(21) Appl. No.: 18/539,399

(22) Filed: Dec. 14, 2023

(65) Prior Publication Data

US 2024/0297898 A1 Sep. 5, 2024

Related U.S. Application Data

(60) Provisional application No. 63/488,209, filed on Mar. 3, 2023.

(51) Int. Cl.
*H04L 9/00* (2022.01)
*H04L 9/40* (2022.01)
(52) U.S. Cl.
CPC ........ *H04L 63/145* (2013.01); *H04L 63/1416* (2013.01); *H04L 63/1433* (2013.01)

(58) Field of Classification Search
CPC .............. H04L 63/145; H04L 63/1416; H04L 63/1433; G06F 21/316
See application file for complete search history.

(56) References Cited

U.S. PATENT DOCUMENTS

2011/0314408 A1* 12/2011 Yolleck .............. H04L 63/1483
715/777
2021/0406883 A1* 12/2021 Gaonkar ............. G06N 3/0499

* cited by examiner

*Primary Examiner* — Syed M Ahsan
(74) *Attorney, Agent, or Firm* — Troutman Pepper Locke, LLP; James E. Schutz; Mark Lehi Jones

(57) ABSTRACT

Systems and methods are provided for detecting potentially fraudulent online behavior, and for assessing advanced user patterns by the detection of the use of multiple windows or tabs. The method includes collecting behavioral data of a user across windows and/or tabs of a browser of a user device running on or accessing a website, determining the use of multiple browser tabs and/or windows running on the website by associating a foreground process of the browser to a background process of the browser, comparing the collected behavioral data and the determined use of the multiple browser tabs and/or windows running on the website to normal use patterns and fraudulent use patterns, and authorizing the online session based on the comparing indicating a match with normal use patterns or denying the online session based on the comparing indicating a match with one or more fraudulent use patterns.

18 Claims, 10 Drawing Sheets

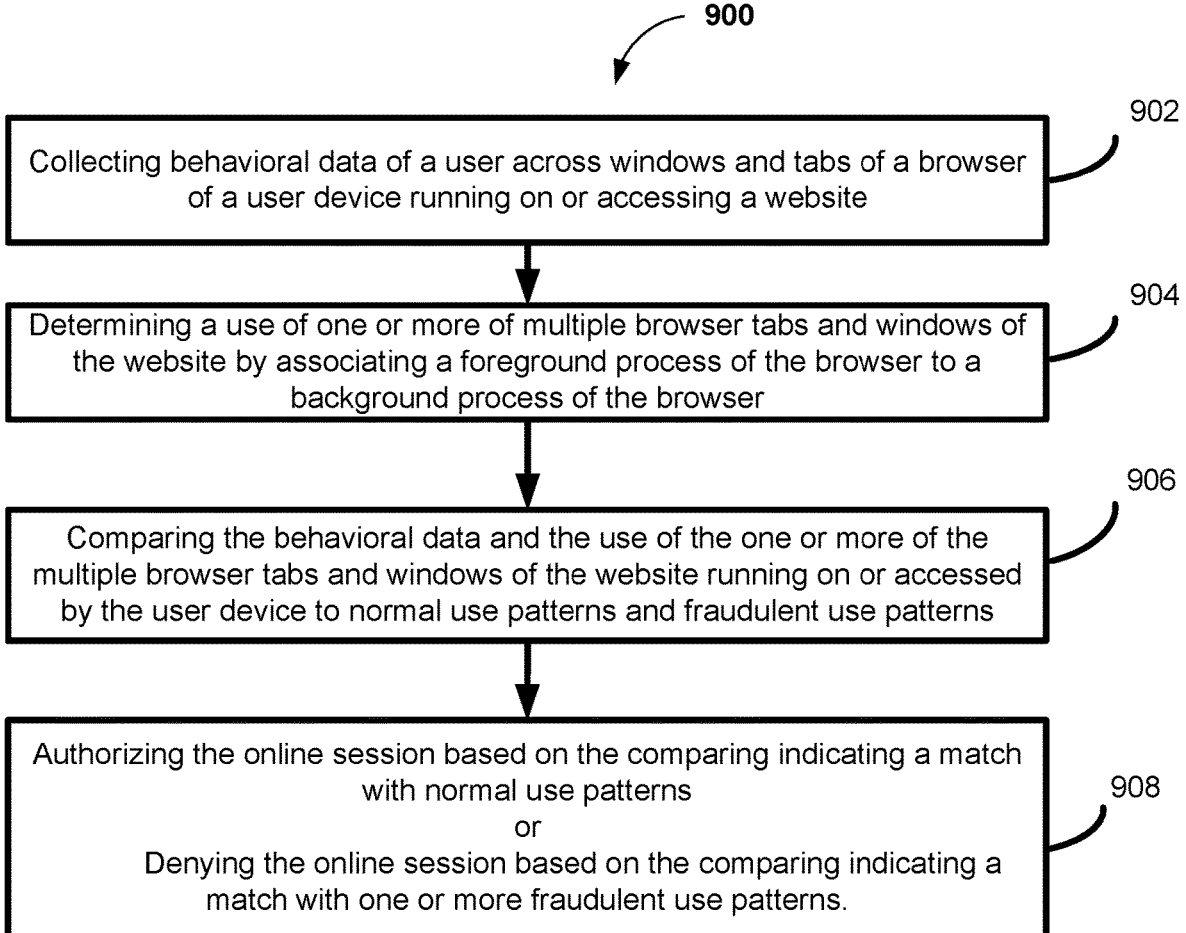

900

Collecting behavioral data of a user across windows and tabs of a browser of a user device running on or accessing a website

902

Determining a use of one or more of multiple browser tabs and windows of the website by associating a foreground process of the browser to a background process of the browser

904

Comparing the behavioral data and the use of the one or more of the multiple browser tabs and windows of the website running on or accessed by the user device to normal use patterns and fraudulent use patterns

906

Authorizing the online session based on the comparing indicating a match with normal use patterns
or
Denying the online session based on the comparing indicating a match with one or more fraudulent use patterns.

SYSTEMS AND METHODS FOR DETECTING ADVANCED USERS BY DETECTION OF THE USE OF MULTIPLE WINDOWS OR TABS

CROSS-REFERENCE TO RELATED APPLICATIONS

This application claims priority under 35 U.S.C. 119 to U.S. Provisional Patent Application No. 63/488,209 entitled "Systems and Methods for Detecting Advanced Users by Detection of the use of Multiple Windows or Tabs," filed 3 Mar. 2023, the contents of which are incorporated by reference in their entirety as if fully set forth herein.

FIELD OF THE DISCLOSED TECHNOLOGY

The disclosed technology relates generally to the detection of potentially fraudulent online behavior, and more particularly to systems and methods for assessing advanced user patterns by the detection of the use of multiple windows or tabs.

BACKGROUND

Tracking user online behavior patterns can provide important insights for businesses, service providers, web designers, etc. Knowledge of a user's behavior can be utilized to enhance the user's experience, optimize advertising campaigns, put procedures in place to improve security and prevent fraud, etc.

One hallmark indicator of potentially fraudulent behavior is when a user operates a computer with multiple user interface windows open and/or multiple browser tabs open. This information can indicate fraudulent behavior, but in certain cases, multiple views may be necessary for the user to perform legitimate actions. However, the current state-of-the-art user behavioral mapping solutions do not detect or track the number of tabs or windows a user has open while accessing a site.

One method of tracking certain online behaviors while preventing the spread of computer viruses is via the use of sandboxing, which is a common practice that allows the software to crash or contain malicious code without affecting other related processes. However, sandboxed processes are completely independent and cannot share information, making it difficult to determine if a user has multiple views open.

The conventional method for detecting multiple views relies on correlating browser and device information using a session date and a userAgent string. However, this information can be easily manipulated and does not provide enough information to make an accurate determination of a user's behavior.

Since information about open page views is not available to service providers, they are unable to track and correlate the data collected from each view with certainty. As a result, service providers cannot make an exact assertion about a user's online behavior in terms of open windows and tabs. The current state-of-the-art solutions to correlate view information (such as IP, userAgent, DateTime, and other device information) can be spoofed, and even when they are combined, they do not provide sufficient information to allow making an accurate assessment of the user's windows and tabs behavior.

There is a need for improved systems and methods for assessing advanced user patterns by the detection of the use of multiple windows or tabs.

BRIEF SUMMARY

The disclosed technology enables enhanced detection of potentially fraudulent behavior by detection and analysis of multiple browser tabs and/or windows of a user device running on or accessing the same website. Certain exemplary implementations of the disclosed technology allow for the identification of advanced user patterns, which can be compared against normal behavior or suspected fraud. Certain exemplary implementations of the disclosed technology may utilize both foreground and background processes in a web browser combined with communication channels between such processes to identify specific browser contexts. In certain implementations, the BroadcastChannel interface and sessionStorage property of a browser may be utilized. In certain exemplary implementations, a periodic check may be run to ensure that the data is up to date. Implementations of the disclosed technology may be used by a digital service provider to determine a user behavior profile and detect multiple account accesses or phishing attempts.

According to an exemplary implementation of the disclosed technology, a computer-implemented method is disclosed for controlling access to an online session by detection of advanced user patterns. The method includes collecting behavioral data of a user across windows and tabs of a browser running on or accessing a website, determining the use of multiple browser tabs and/or windows of a user device running on or accessing the website by associating a foreground process of the browser to a background process of the browser, comparing the collected behavioral data and the determined use of the multiple browser tabs and/or windows to normal use patterns and fraudulent use patterns, and authorizing the online session based on the comparing indicating a match with normal use patterns or denying the online session based on the comparing indicating a match with one or more fraudulent use patterns.

According to another exemplary implementation of the disclosed technology, a computer-implemented method is disclosed for enhanced detection of use of multiple browser tabs and/or windows of a same website. The method can include tying a foreground process to a background process of an online session, determining a number of simultaneous views of the same website open on a user device browser; and terminating the online session based on the number of simultaneous views being greater than a predetermined number. In some implementations, the method can include tying a foreground process to a background process of an online session, determining a number of simultaneous views of different websites that are open on a user device browser; and terminating the online session based on the number of simultaneous views being greater than a predetermined number.

A system is disclosed herein for authorizing or denying an online session. The system includes a processor; and a memory having programming instructions stored thereon, which, when executed by the processor, cause the processor to collect behavioral data of a user across windows and tabs of a user device browser running on or accessing a website, determine the use of one or more of multiple browser tabs and windows running on or accessing the website by associating a foreground process of the browser to a background process of the browser, compare the collected behavioral data and the use of the multiple browser tabs and/or windows to normal use patterns and fraudulent use patterns, and authorize the online session based on the compare indicating a match with normal use patterns or deny the online session based on the compare indicating a match with one or more fraudulent use patterns.

Certain exemplary implementations of the disclosed technology include a non-transitory computer-readable medium having stored thereon software instructions that, when executed by a processor, cause the processor to perform a method. The method includes collecting behavioral data of a user across windows and tabs of a user device browser running on or accessing a website, determining the use of multiple browser tabs and/or windows running on or accessing the website by associating a foreground process of the browser to a background process of the browser, comparing the collected behavioral data and the use of the multiple browser tabs and/or windows to normal use patterns and fraudulent use patterns, and authorizing the online session based on the comparing indicating a match with normal use patterns or denying the online session based on the comparing indicating a match with one or more fraudulent use patterns.

Certain implementations of the disclosed technology will now be described with the aid of the following drawings and detailed descriptions.

BRIEF DESCRIPTION OF THE DRAWINGS

FIG. 9 is a flow diagram 900 of an example method, in accordance with certain implementations of the disclosed technology.

Figure 1:
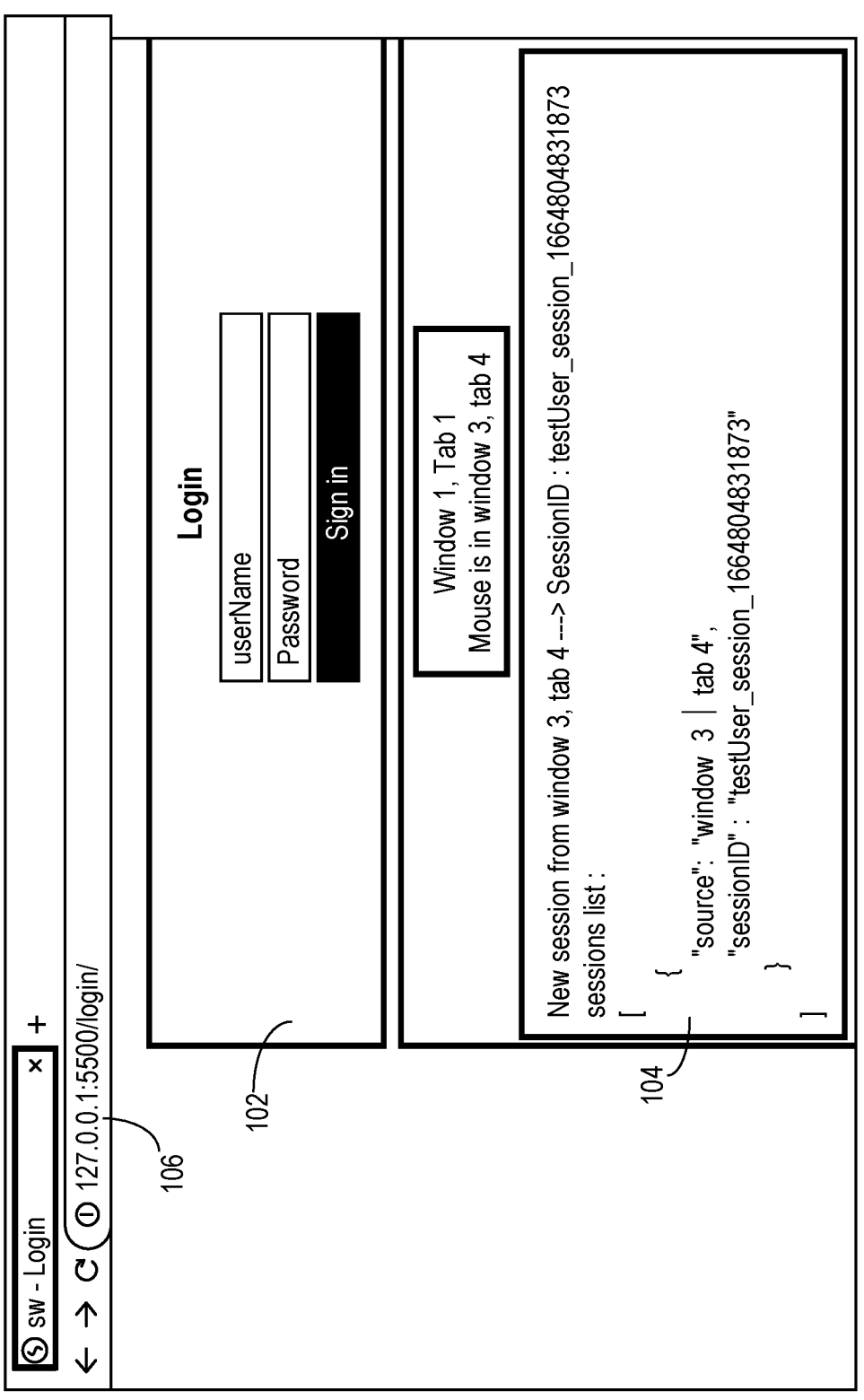
FIG. 1 is an example browser window representing an inferred screen layout including a user login window 102 in which a user may enter login credentials, a results pane 104, and an address identifier 106. The results pane 104 may indicate the window and tab currently selected by the user, the window and tab location of the user's mouse, and session identifier results, in accordance with certain exemplary implementations of the disclosed technology.

The disclosed technology will now be described using the detailed description in conjunction with the drawings and the attached claims.

DETAILED DESCRIPTION

Systems and methods are disclosed for authorizing or denying an online session by determining the number of simultaneous browser views (windows and/or tabs) a user of a specific website (domain and/or page) has opened on a user device. In certain exemplary implementations, a method is provided for authorizing or denying an online session by tying a foreground process to a background process via counting port accesses. In certain exemplary implementations, the number of detected views open may be compared to and/or matched to a previously learned behavior of the user. In other embodiments, the number of detected open views may be compared to similar open view metrics associated with suspected fraud. In certain exemplary implementations, the disclosed technology can provide an exact number of such opened views, in contrast to existing methods.

The disclosed technology may provide certain advantages over previous or conventional approaches, including, but not limited to: (1) enhancing advanced user detection by using new metrics; (2) assertion of usage of several tabs or windows of a browser with 100% accuracy as soon as the page loads; (3) augmented behavioral profiling via the user's tab and window behavior; (4) the linking of sessions running on the same desktop but in different tabs or windows, even if they are from different logged-in users and whether the users are logged in at the same time or not; and/or (5) collecting and tying together behavioral data from other browsing contexts on the same device including non-submitted data.

In certain exemplary implementations, systems, and methods are provided for correlating behavioral data across browsing contexts (tab, window, frame, iframe) on the same device regardless of if it has already been submitted to a service provider in different browsing contexts. In one exemplary embodiment, data already submitted to a service provider from one or several browsing contexts may be correlated to any subsequently submitted data from other browsing contexts on the same device. In another exemplary implementation, the behavioral data on any browsing contexts on the same device not submitted to a service provider can be attached to the next data submission from any of these browsing contexts to augment behavioral profiles with cross-browsing-context data.

In one embodiment, a method is provided for comparing and matching a user's browser window and tab usage to a population profile for normal users vs. fraudulent users. For example, there may be common cases for having multiple views open, and there may be cases where the detection of such multiple views is a strong indicator of possible fraudulent user behavior. Such an example may be to detect multiple new account openings on the same computer when a fraudster manually or via a script creates several new accounts on a website at once.

In certain exemplary implementations, the disclosed technology may be used to detect phishing attempts where a fraudster logs in to their account in one view and into their victim's account in another view to make a fraudulent transaction. In certain exemplary implementations, the service provider may be informed of multiple accounts being accessed from the same device simultaneously. Furthermore, information may be provided to the service provider regarding a user's switching between views so that the user activity may be followed in real time. Certain exemplary implementations of the disclosed technology may infer screen layout and the number of screens used, which may be compared to the normal usage of the user.

Window & Tab Profiling

In accordance with certain exemplary implementations of the disclosed technology, window and tab profiling may be enabled by invoking a background process that shares elements of the foreground processes accessed by the user when opening the views that were meant to be independent. In this example implementation, both foreground and background processes may be utilized and monitored in a web browser. Background processes, for example, are unique per domain name or for any set of pages for that domain. Foreground processes, for example, are unique per browser tab. By using the communication channels between background and foreground processes available in all non-deprecated browsers, certain implementations of the disclosed technology may be utilized to identify specific browser contexts.

In one example implementation, a standard JavaScript foreground process may be used by extending an existing JavaScript SDK.

In accordance with certain exemplary implementations of the disclosed technology, a BroadcastChannel interface may be used. For example, a background process may be created responsive to the establishment of a new interface of the BroadcastChannel on the first tab of a given website. In certain exemplary implementations, any subsequent new tab or window on that page or domain may connect to this background process by opening a new port to it instead of creating a new background process when a new interface of BroadcastChannel is created. In certain exemplary implementations, a foreground process may be created via a postMessage( ) method call, which may send a request to the background process to access the stored list of opened ports, and the background process may call postMessage( ) with this list to forward it to all foreground processes or any set of foreground processes on that page or domain on the user's device for this browser.

The BroadcastChannel interface represents a named channel that any browsing context of a given origin can subscribe to. It allows broadcasting messages between different documents (in different windows, tabs, frames, or iframes) of the same origin. In accordance with certain exemplary implementations of the disclosed technology, messages may be broadcasted via a message event fired at all BroadcastChannel objects listening to the channel, except the object that sent the message.

Certain embodiments of the disclosed technology may utilize the sessionStorage property in conjunction with the BroadcastChannel interface. The read-only sessionStorage property of a browser may access a session Storage object for the current origin. By listing the opened ports for the background process and checking a specific stored state in the browser's sessionStorage for instance, the disclosed technology may assert if the newly opened view of a web app is opened in a new tab in the same browser window as other views that can access the same sessionStorage state. The absence of this sessionStorage state combined with a non-empty list of opened BroadcastChannel ports implies that the current view was opened in a new window.

In certain exemplary implementations, the usage of sessionStorage can be replaced using other storage properties of the browser, and the usage of BroadcastChannel can be replaced by other browser background processes. In certain exemplary implementations, a periodic check can be run to ensure that no ports have been closed (therefore their associated tab/window was closed) or this check can run at any time to ensure that this data is up to date. In certain implementations, the disclosed technology may be supported in non-deprecated browsers. In certain implementations, a digital service provider can employ the disclosed technology to determine a profile of user behavior, e.g. match the number of open views to the normal behavior of the user.

In another exemplary implementation, only foreground processes may be utilized with the sessionStorage and any other cross-session browser storage. For example, localStorage may be used for this implementation. The localStorage read-only property of the window interface may allow access to a Storage object for a document's origin, and the stored data may be saved across browser sessions.

In accordance with certain exemplary implementations of the disclosed technology, the foreground thread on the first opened tab on a website may be utilized to create two new states: "tabsAmount" and "windowsAmount" with each a value of 1. These states/values may be stored in the localStorage. Then another state may be created "hasTabsInWindow" boolean value false which may be saved in the sessionStorage. The states in localStorage can be timestamped or a hash may be provided by the server to avoid false positives and conflicts with older sessions if a related state clean-up could not run due to various events such as impromptu browser processes termination, forced interruption of browser processes, computer crash, etc. In this example implementation, a new tab on a website may first check if both states in localStorage are accessible. If they are, this means there are "tabsAmount" tabs opened on the website and "windowsAmount" windows. The localStorage state "tabsAmount" may then be incremented. If the newly opened tab is in another window, the sessionStorage state "hasTabsInWindow" will not exist so it can be created and the localStorage state "windowsAmont" may be incremented. But if the sessionStorage state "hasTabsInWindow" does already exist when the tab is opened, the localStorage "windowsAmount" may not be incremented because this tab wasn't opened in a new window.

In certain implementations, the foreground process associated with that tab may add an event listener on the localStorage changes to see further increments of that state when other tabs are opened later. This way, all other currently opened tabs on this website will have an updated value of opened tabs. All the opened tabs may also listen for the window event "beforeunload" to update the state values when they are being closed.

Collecting Behavioral Data from Other Views of a Website

In accordance with certain exemplary implementations of the disclosed technology, the collection of behavioral data on several views may be enabled so that they may be linked as originating from the same browsing session to allow the collection of behavioral data not submitted in other views.

In certain exemplary implementations, one or more of the previous implementations described above may be utilized. For example, the BroadCastChannel interface may be used as a background process to retrieve the unique navigation session identifier from the other browsing contexts of a given website on the user's device. The unique navigation session identifier used by a digital service provider may be used later to identify the behavioral data collection that has been ongoing on the current view or browsing session of a given website on the user's device.

In accordance with certain exemplary implementations of the disclosed technology, the foreground process on a specific active view can use the postMessage( ) method call to send a request to the background process so that it may also use the postMessage( ) method call to all of its other opened ports. This call may request all foreground processes attached to those ports to send back to the background process using the same postMessage( ) method call, the unique navigation session identifier for their browsing context. Once the background process have received the unique navigation session identifier from each of its opened ports other than the one that did the first request, it may build a list from all these unique navigation session identifiers and forward it to the foreground process that did the initial request via a call to postMessage( ) to its related port.

In accordance with certain exemplary implementations of the disclosed technology, the BroadCastChannel interface can be used to retrieve behavioral data from other views. For example, the foreground process on a specific active view can use the postMessage( ) method call to send a request to the background process for it to also use the postMessage( ) method call to all of its other opened ports. This call may request all foreground processes attached to those ports to send back (to the background process via a postMessage( ) call) the behavioral data they've gathered using the service provider's behavioral data collector. Once the background process has received the behavioral data from each of its opened ports other than the one that did the first request, it may forward the behavioral data to the foreground process that performed the initial request via a call to postMessage( ) to its related port.

FIG. 1 illustrates an example browser window representing an inferred screen layout including a user login window 102 in which a user may enter login credentials. Also depicted is a results pane 104, and a browsing address identifier 106. The results pane 104 may indicate the window and tab currently selected by the user, the window and tab location of the user's mouse, and session identifier results, in accordance with certain exemplary implementations of the disclosed technology.

Figure 2:
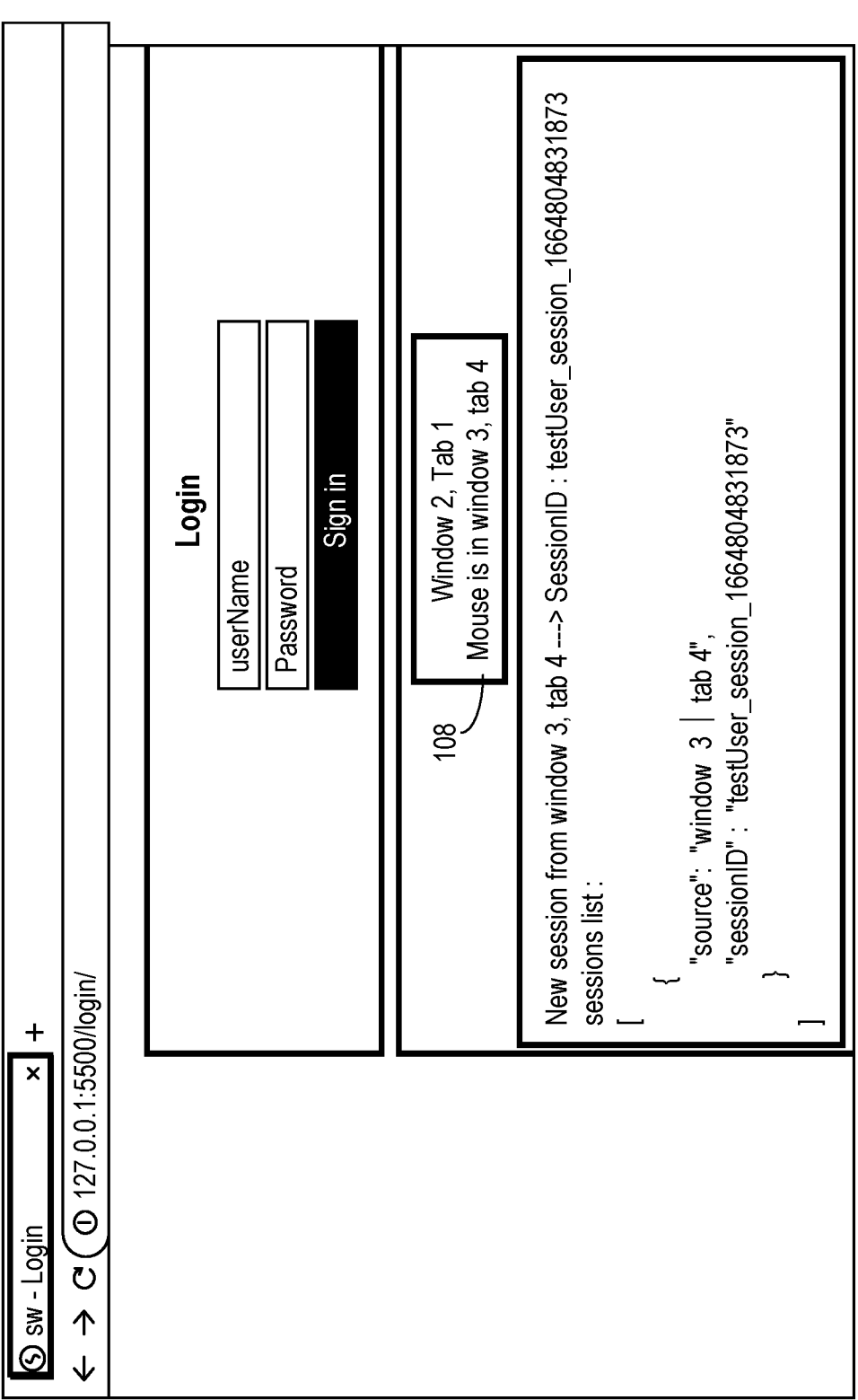
FIG. 2 is an example browser window as in FIG. 1, with a results pane 108 indicating that a different window is open, in accordance with certain exemplary implementations of the disclosed technology.

FIG. 2 is an example browser window as in FIG. 1, with a results pane 108 indicating that a different window is open, in accordance with certain exemplary implementations of the disclosed technology.

Figure 3:
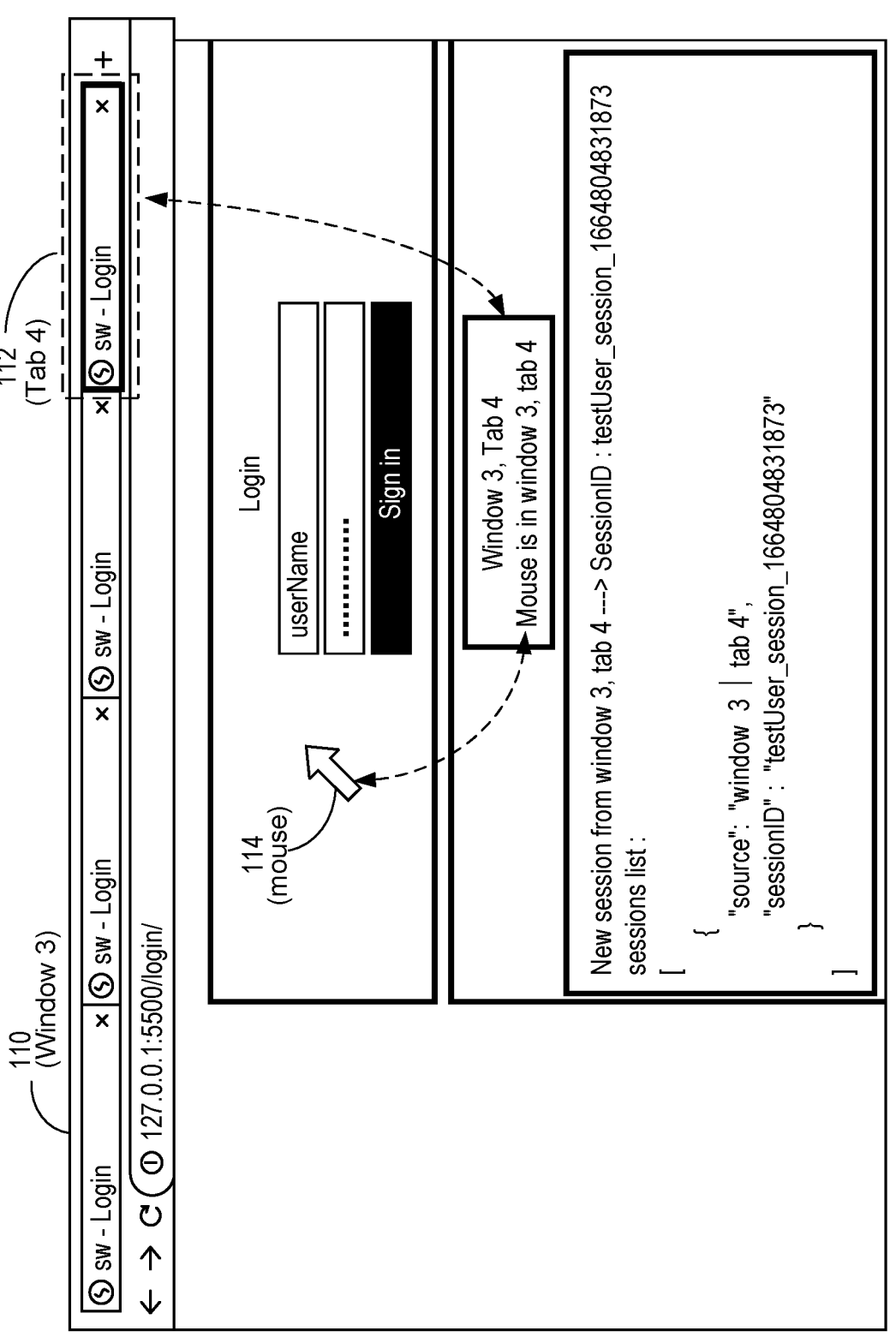
FIG. 3 is an example browser window as in FIG. 1, with the results pane indicating that a different window 110 is open, a different tab 112 is open and the mouse 114 is in a specific window and tab, in accordance with certain exemplary implementations of the disclosed technology.

FIG. 3 is an example browser window as in FIG. 1, with the results pane indicating that a different window 110 and tab 112 are open, and the mouse 114 is in a specific window and tab, In accordance with certain exemplary implementations of the disclosed technology. This figure depicts a scenario where a user may enter their credentials into one of (possibly numerous) open tabs and windows and they may click on the "Sign In" button. In this example embodiment, all of the other windows and tabs can detect which window and tab the login was made. In certain exemplary implementations, it is also possible to share other kinds of data between windows and tabs, such as a current mouse position, count of opened windows and tabs, and/or any other kind of behavioral data that can be gathered.

In accordance with certain exemplary implementations of the disclosed technology, the communication of other opened tabs and windows (and/or other kinds of data as described above) may be shared per webpage and per domain. In certain exemplary implementations, such information may not be shared between different domains.

Figure 4:
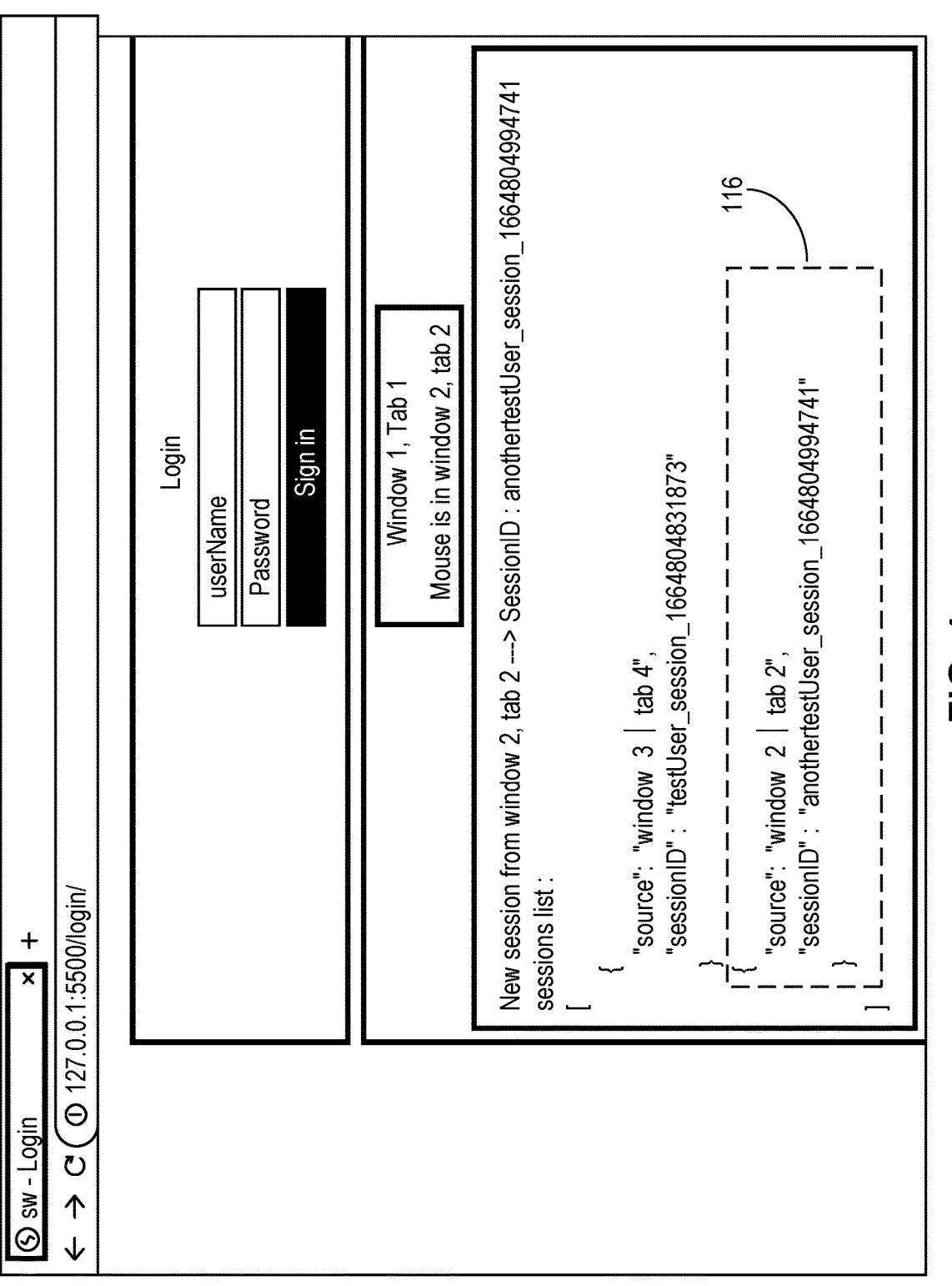
FIG. 4 is an example browser window (similar to FIG. 1) representing an inferred screen layout in which a user may attempt to log into another account from another window, including window identifier results 116, in accordance with certain exemplary implementations of the disclosed technology.

FIG. 4 is an example browser window (similar to FIG. 1) representing an inferred screen layout in which a user may attempt to log into another account from another window, including window identifier results 116, in accordance with certain exemplary implementations of the disclosed technology.

Figure 5:
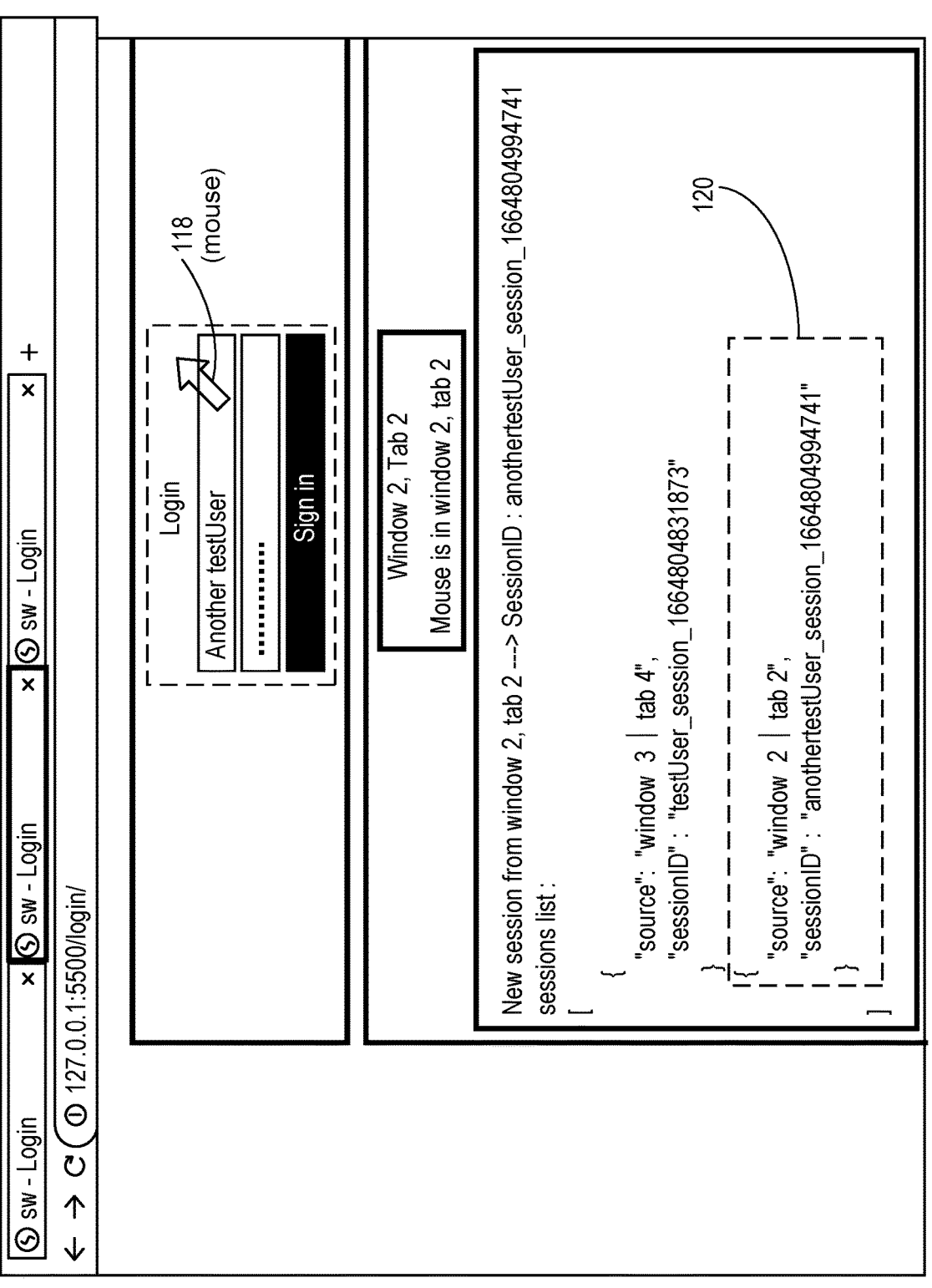
FIG. 5 is an example browser window as in FIG. 4, illustrating an attempt to login via a different tab, a session identifier that indicates the window and tab position of the mouse 118, and window identifier results 120, in accordance with certain exemplary implementations of the disclosed technology.

FIG. 5 is an example browser window as in FIG. 4, illustrating an attempt to login via a different tab, a session identifier that indicates the window and tab position of the mouse 118, and window identifier results 120, in accordance with certain exemplary implementations of the disclosed technology.

Figure 6:
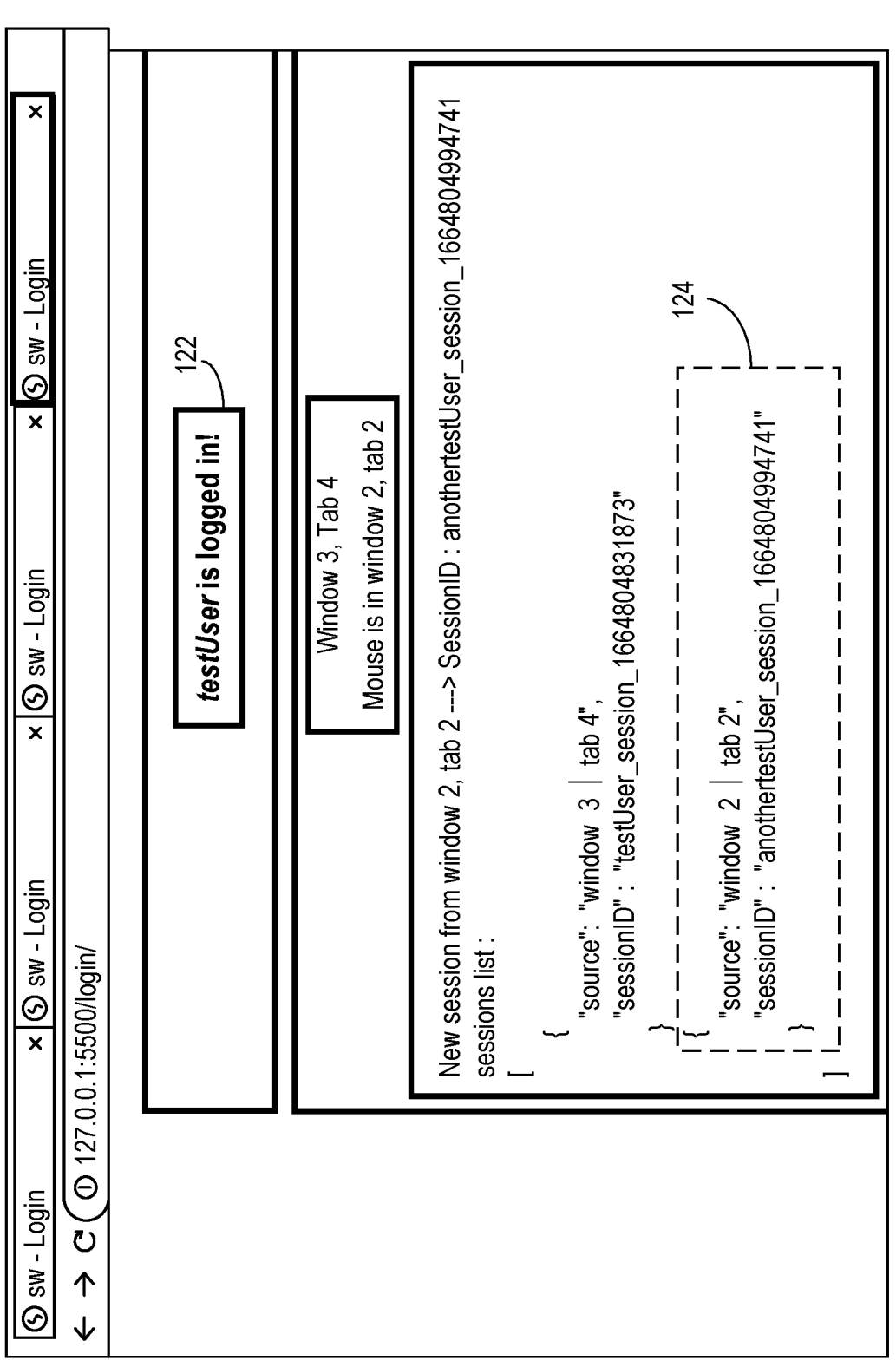
FIG. 6 is an example browser window as in FIG. 4, illustrating that the disclosed technology has detected a user logged in 122 with a window identifier 124 indicating a simultaneous login via a different tab, in accordance with certain exemplary implementations of the disclosed technology.

FIG. 6 is an example browser window as in FIG. 4, illustrating that the disclosed technology has detected a user logged in 122 with a window identifier 124 indicating a simultaneous login via a different tab and illustrating that the disclosed technology has detected a simultaneous login via a different tab, in accordance with certain exemplary implementations of the disclosed technology.

In accordance with certain exemplary implementations of the disclosed technology, a user may attempt to login to another account on another window, which may not override existing data. For example, previous browsing window and tab data may be persisted so that the system can detect which users are logged in at the same time on the same device, for example, so that instances of such sessions and/or events may be tied together.

Figure 7:
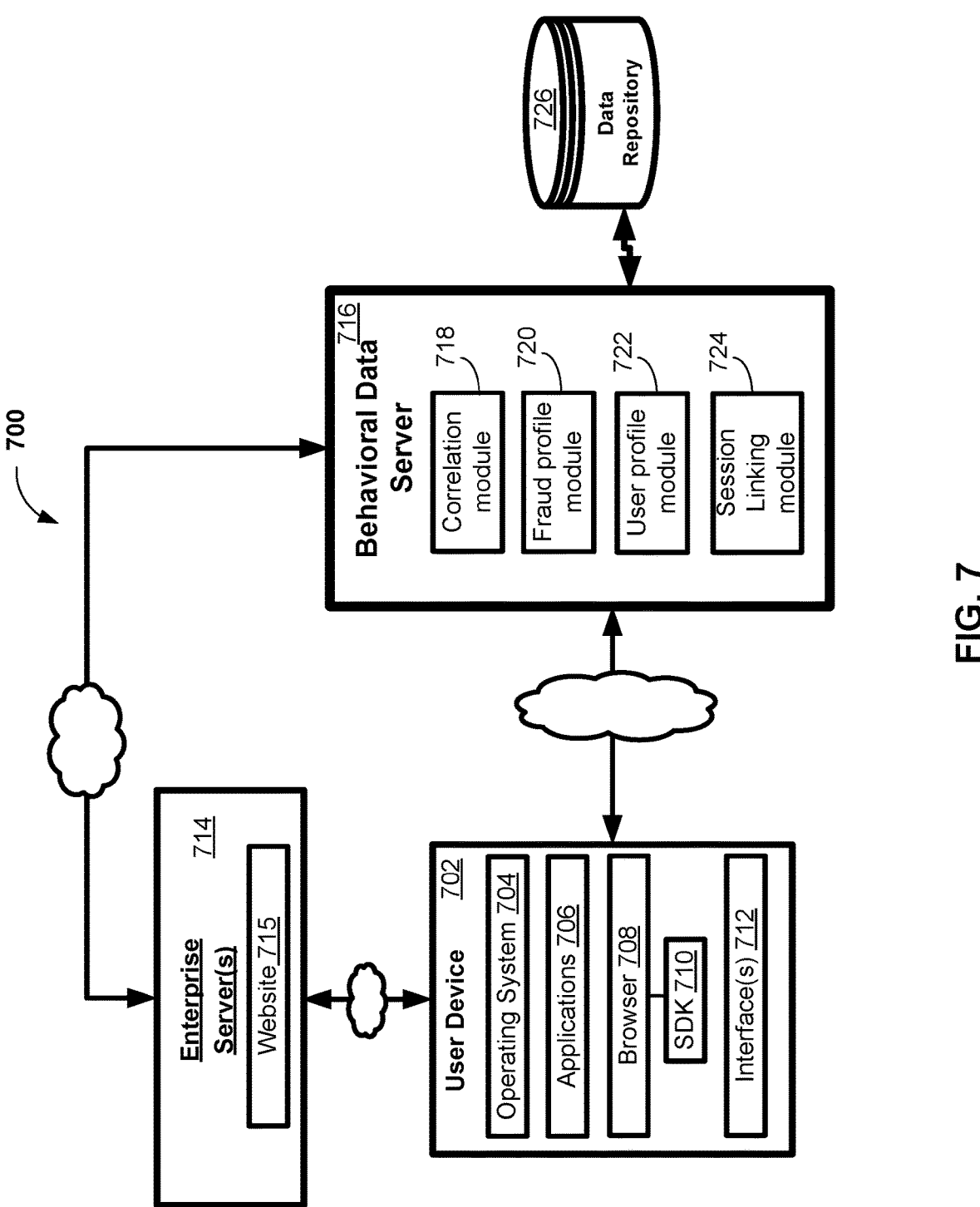
FIG. 7 is an example block diagram of a system/process 700, in accordance with certain exemplary implementations of the disclosed technology.

FIG. 7 is an example block diagram of a system 700, in accordance with certain exemplary implementations of the disclosed technology. The system 700 may include a behavioral data server 716 in communication with a user device 702 and an enterprise server 714. In certain exemplary implementations, the system 700 may be configured to collect behavioral data from the user device 702 regarding windows and tabs of a browser 708 running on the user device 702 while accessing a website 715 hosted by the enterprise server 714, for example, to determine a use of one or more of multiple browser tabs and windows running on user device 702 by associating a foreground process of the browser 708 to a background process of the user browser 708, compare by the behavioral data server 716 the collected behavioral data and determined use of multiple browser tabs and windows of the website 715 running on the user device 702 browser 708 to normal use patterns and fraudulent use patterns, and authorize the online session based on the comparison indicating a match with normal use patterns or deny the online session based on the comparison indicating a match with one or more fraudulent use patterns.

In certain exemplary implementations, the behavioral data server 716 may include a correlation module 718, a fraud profile module 720, a user profile module 722, and/or a session linking module 724. Certain exemplary implementations of the disclosed technology may include a data repository 726 in communication with the behavioral data server 716, for example, to store and retrieve profile data.

In accordance with certain exemplary implementations of the disclosed technology, the user device 702 can include standard software and/or hardware components such as an operating system 704, applications 706, a browser 708, and various input/output interfaces 712. In certain exemplary implementations, an SDK 710 may be in communication with the browser 708.

Each of the devices in the example system 700 may also include one or a plurality of input/output network interfaces for communicating with the other devices via a network (e.g., the internet).

One skilled in the art will recognize that an implementation of the actual devices shown in FIG. 7 may contain other components as well, and FIG. 7 is a high-level representation of some of the components of such a device for illustrative purposes.

Figure 8:
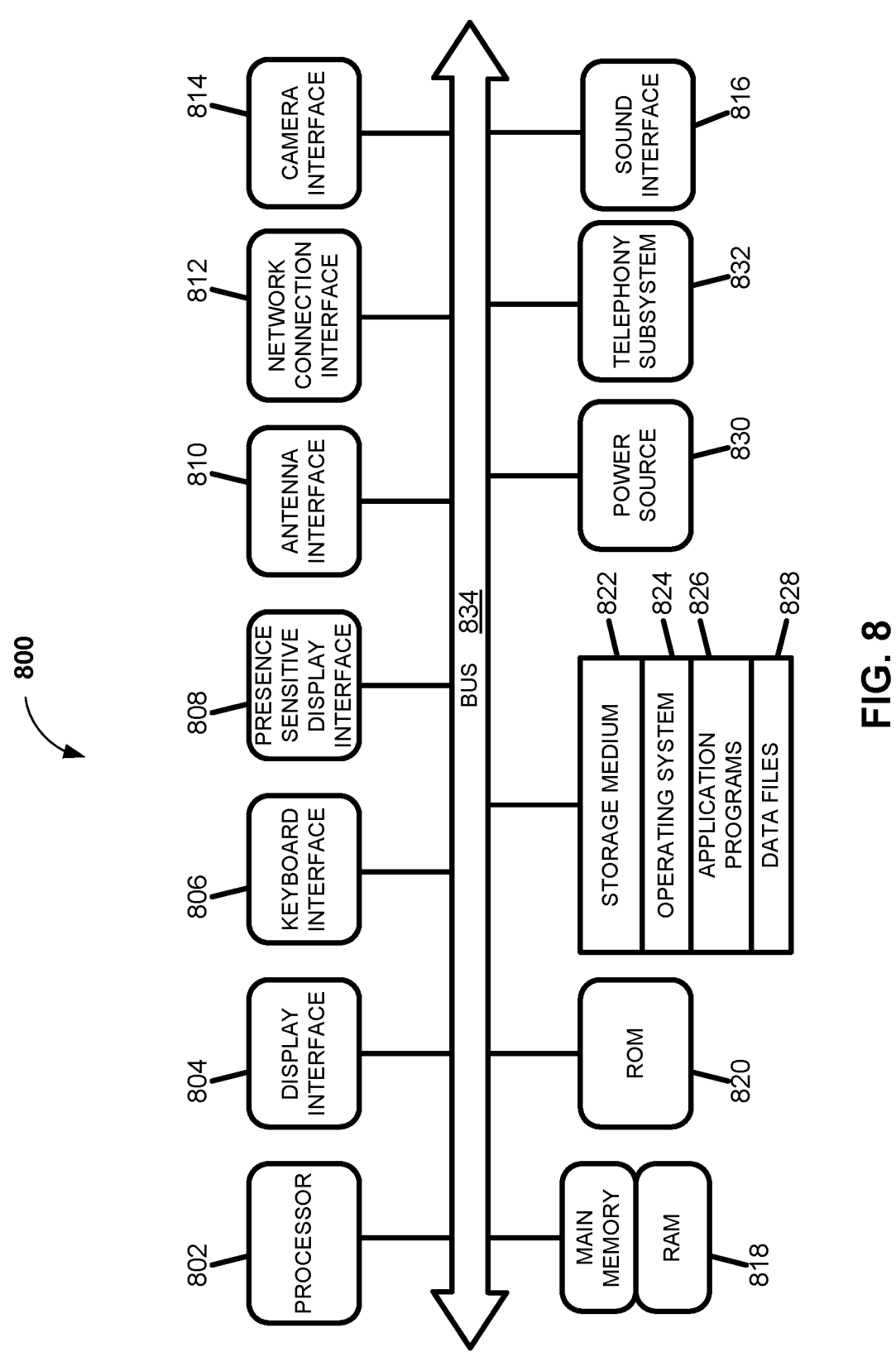
FIG. 8 is a high-level block diagram of a computing device 800 that may be used to carry out embodiments of the disclosed technology.

FIG. 8 depicts a block diagram of an illustrative computing device 800 that may be utilized to enable certain aspects of the disclosed technology. Various implementations and methods herein may be embodied in non-transitory computer-readable media for execution by a processor. It will be understood that the computing device 800 is provided for example purposes only and does not limit the scope of the various implementations of the communication systems and methods.

The computing device 800 of FIG. 8 includes one or more processors where computer instructions are processed. The computing device 800 may comprise the processor 802, or it may be combined with one or more additional components shown in FIG. 8. In some instances, a computing device may be a processor, controller, or central processing unit (CPU). In yet other instances, a computing device may be a set of hardware components.

The computing device 800 may include a display interface 804 that acts as a communication interface and provides functions for rendering video, graphics, images, and texts on the display. In certain example implementations of the disclosed technology, the display interface 804 may be directly connected to a local display. In another example implementation, the display interface 804 may be configured for providing data, images, and other information for an external/remote display. In certain example implementations, the display interface 804 may wirelessly communicate, for example, via a Wi-Fi channel or other available network connection interface 812 to the external/remote display.

In an example implementation, the network connection interface 812 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high-definition multimedia (HDMI) port, a video port, an audio port, a Bluetooth port, a near-field communication (NFC) port, another like communication interface, or any combination thereof. In one example, the display interface 804 may be operatively coupled to a local display. In another example, the display interface 804 may wirelessly communicate, for example, via the network connection interface 812 such as a Wi-Fi transceiver to the external/remote display.

The computing device 800 may include a keyboard interface 806 that provides a communication interface to a keyboard. According to certain example implementations of the disclosed technology, the presence-sensitive display interface 808 may provide a communication interface to various devices such as a pointing device, a touch screen, etc.

The computing device 800 may be configured to use an input device via one or more of the input/output interfaces (for example, the keyboard interface 806, the display interface 804, the presence-sensitive display interface 808, the network connection interface 812, the camera interface 814, sound interface 816, etc.) to allow a user to capture information into the computing device 800. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor, a smartcard, and the like. Additionally, the input device may be integrated with the computing device 800 or may be a separate device. For example, the input device may be an accelerometer, a magnetometer, a digital camera, a microphone, and an optical sensor.

Example implementations of the computing device 800 may include an antenna interface 810 that provides a communication interface to an antenna; a network connection interface 812 that provides a communication interface to a network. According to certain example implementations, the antenna interface 810 may utilize to communicate with a Bluetooth transceiver.

In certain implementations, a camera interface 814 may be provided that acts as a communication interface and provides functions for capturing digital images from a camera. In certain implementations, a sound interface 816 is provided as a communication interface for converting sound into electrical signals using a microphone and for converting electrical signals into sound using a speaker. According to example implementations, random-access memory (RAM) 818 is provided, where computer instructions and data may be stored in a volatile memory device for processing by the CPU 802.

According to an example implementation, the computing device 800 includes a read-only memory (ROM) 820 where invariant low-level system code or data for basic system functions such as basic input and output (I/O), startup, or reception of keystrokes from a keyboard are stored in a non-volatile memory device. According to an example implementation, the computing device 800 includes a storage medium 822 or other suitable types of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 824, application programs 826 (including, for example, a web browser application, a widget or gadget engine, and or other applications, as necessary) and data files 828 are stored. According to an example implementation, the computing device 800 includes a power source 830 that provides an appropriate alternating current (AC) or direct current (DC) to power components. According to an example implementation, the computing device 800 includes a telephony subsystem 832 that allows the device 800 to transmit and receive sound over a telephone network. The constituent devices and the CPU 802 communicate with each other over a bus 834.

In accordance with an example implementation, the CPU 802 has an appropriate structure to be a computer processor. In one arrangement, the computer CPU 802 may include more than one processing unit. The RAM 818 interfaces with the computer bus 834 to provide quick RAM storage to the CPU 802 during the execution of software programs such as the operating system application programs, and device drivers. More specifically, the CPU 802 loads computer-executable process steps from the storage medium 822 or other media into a field of the RAM 818 to execute software programs. Data may be stored in the RAM 818, where the data may be accessed by the computer CPU 802 during execution. In one example configuration, the device 800 includes at least 128 MB of RAM, and 256 MB of flash memory.

The storage medium 822 itself may include a number of physical drive units, such as a redundant array of independent disks (RAID), a floppy disk drive, a flash memory, a USB flash drive, an external hard disk drive, a thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 800 to access computer-executable process steps, application programs, and the like, stored on removable and non-removable memory media, to off-load data from the device 800 or to upload data onto the device 800. A computer program product, such as one utilizing a communication system may be tangibly embodied in storage medium 822, which may comprise a machine-readable storage medium.

According to one example implementation, the term computing device, as used herein, may be a CPU, or conceptualized as a CPU (for example, the CPU 802 of FIG. 8). In this example implementation, the computing device (CPU) may be coupled, connected, and/or in communication with one or more peripheral devices.

It should also be understood by one skilled in the art that the example windows illustrated in FIGS. 1 through 6 may be implemented on a computing device 800 such as is shown in FIG. 8.

FIG. 9 is a flow diagram of a method 900 for controlling access to an online session by detection of advanced user patterns, in accordance with certain implementations of the disclosed technology. In block 902, the method 900 includes collecting behavioral data of a user across windows and tabs of a browser running on or accessing a website. In block 904, the method 900 includes determining a use of multiple browser tabs and/or windows of a user device running on or accessing a website. Such determination may include associating a foreground process of the browser to a background process of the browser. In block 906, the method 900 includes comparing the collected behavioral data and the determined use of the multiple browser tabs and/or windows of the website running on or accessed by the user device to normal use patterns and fraudulent use patterns. In block 908, the method 900 includes authorizing the online session based on the comparing indicating a match with normal use patterns or denying the online session based on the comparing indicating a match with one or more fraudulent use patterns.

In certain exemplary implementations, associating the foreground process of the browser to the background process includes counting port accesses.

In certain exemplary implementations, comparing the collected behavioral data and the determined use of multiple browser tabs and windows running on the website to normal use patterns and fraudulent use patterns includes determining whether a number of multiple browser tabs and windows running on the website are matched to a previously learned behavior of the user.

In accordance with certain exemplary implementations of the disclosed technology, comparing the collected behavioral data and the determined use of multiple browser tabs and windows running on the website to normal use patterns and fraudulent use patterns can include determining whether a number of multiple browser tabs and windows running on the website is matched to known fraudulent patterns.

Certain exemplary implementations of the disclosed technology can include correlating the collected behavioral data across browsing contexts on the same device. In certain exemplary implementations, browsing contexts can include one or more of a tab, a window, a frame, and an iframe. In certain exemplary implementations, behavioral data across browsing contexts data previously submitted to a service provider from one or more browsing contexts may be correlated to subsequently submitted behavioral data corresponding to other browsing contexts on the same device.

Certain exemplary implementations of the disclosed technology can include attaching behavioral data on any browsing contexts on the same device not submitted to a service provider to the next data submission from one or more browsing contexts to augment behavioral profiles with cross-browsing-context data.

In certain exemplary implementations, comparing the collected behavioral data and the determined use of multiple browser tabs and/or windows to normal use patterns and fraudulent use patterns further can include comparing usage of the behavioral data to a normal usage population profile. In certain exemplary implementations, the determined use of multiple browser tabs and/or windows that indicate possible fraudulent user behavior can include multiple new account openings or phishing attempts.

Certain exemplary implementations of the disclosed technology can include invoking a background process that necessitates sharing elements of the foreground processes accessed by the user when opening the windows and tabs of the browser for foreground processes previously configured to be independent.

Certain exemplary implementations of the disclosed technology can include using both foreground and background processes in a web browser, wherein background processes may be unique per domain name or any set of pages for that domain, and foreground processes are unique per browser tab.

Certain exemplary implementations of the disclosed technology can include using one or more communication channels between background and foreground processes in browsers to identify specific browser contexts.

Certain exemplary implementations of the disclosed technology can include utilizing a standard JavaScript foreground process by extending an existing JavaScript SDK.

Certain exemplary implementations of the disclosed technology can include using a BroadcastChannel interface to create a background process and connecting subsequent new tabs or windows to the background process.

Certain exemplary implementations of the disclosed technology can include using a postMessage( ) method call to send a request from the foreground process to the background process to access a stored list of opened ports.

Certain exemplary implementations of the disclosed technology can include configuring the background process to use the postMessage( ) method call to call back with the list to forward the list to all foreground processes on a page or domain on a user's device for the browser.

Certain exemplary implementations of the disclosed technology can include using a sessionStorage property of a browser in conjunction with a BroadcastChannel interface to simplify implementation and check if newly opened views are in new tabs or windows.

Certain exemplary implementations of the disclosed technology can include running a periodic check to ensure that no ports have been closed. Certain exemplary implementations of the disclosed technology can include checking that data is up to date.

Certain exemplary implementations of the disclosed technology can include using only foreground processes and storage properties of the browser, such as sessionStorage, to determine a profile of a user's behavior.

Figure 10:
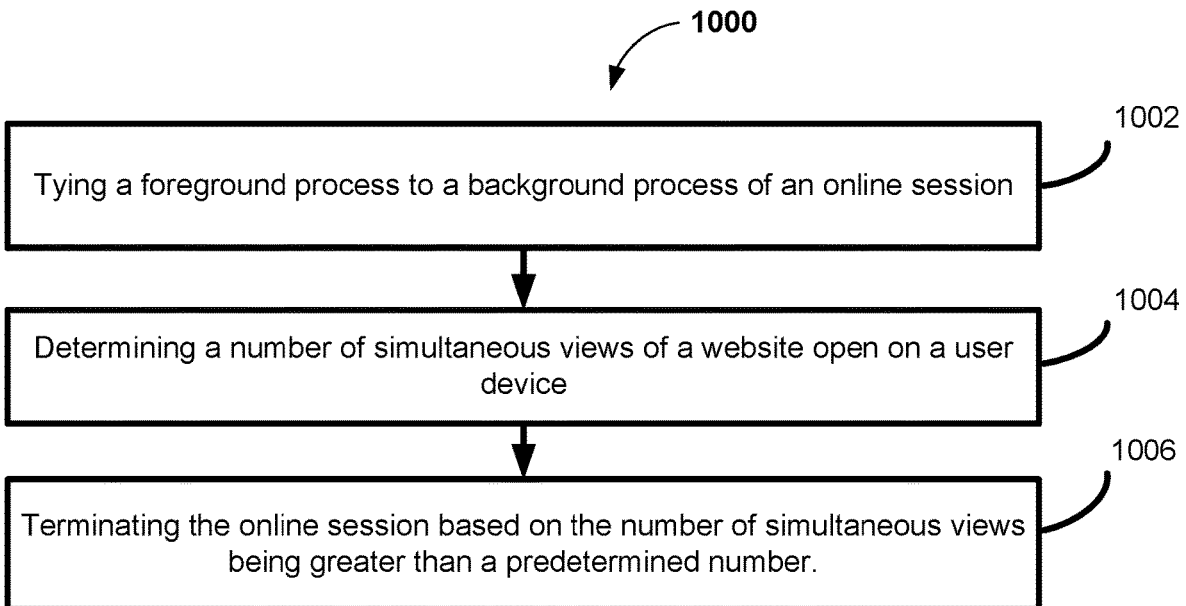
FIG. 10 is a flow diagram 1000 of an example method, in accordance with certain implementations of the disclosed technology.

FIG. 10 is a flow diagram of a method 1000 for enhanced detection of use of multiple browser tabs and windows running on the same website, in accordance with certain implementations of the disclosed technology. In block 1002, the method 1000 includes tying a foreground process to a background process of an online session. In block 1004, the method 1000 includes determining a number of simultaneous views of a website open on a user device. In block 1006, the method 1000 includes terminating the online session based on the number of simultaneous views being greater than a predetermined number.

Certain implementations of the disclosed technology can include matching a number of views open to a previously learned behavior of the user.

Certain implementations of the disclosed technology can include matching a number of views open to a number associated with suspected fraud.

In certain implementations, determining the number of simultaneous views can include counting port accesses.

Certain implementations of the disclosed technology can include collecting behavioral data across windows and tabs of a browser running on the same website.

Certain implementations of the disclosed technology can include correlating data already submitted to a service provider from one or more browsing contexts to any subsequently submitted data from other browsing contexts on the same device.

In certain implementations, tying a foreground process to a background process may utilize a BroadcastChannel interface to connect foreground and background processes and a sessionStorage property to store information about open views.

In certain implementations, the sessionStorage property may be used in conjunction with the BroadcastChannel interface to simplify implementation.

In certain exemplary implementations, the adaptation of the algorithms and/or processes disclosed herein may be facilitated by the detection and matching of one or more of events and/or processes relating to navigating or interacting with web pages that are common for users performing user journeys.

Implementations of the subject matter and the functional operations described herein may be implemented in various systems, digital electronic circuitry, computer software, firmware, or hardware, including the structures disclosed herein and their structural equivalents, or in combinations of one or more of them. Implementations of the subject matter described herein can be implemented as one or more computer program products, i.e., one or more modules of computer program instructions encoded on a tangible and non-transitory computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flow described in this specification can be performed by one or more programmable processors executing one or more computer programs to perform functions by operating on input data and generating output. The processes and logic flows can also be performed by, and apparatus can also be implemented as, special purpose logic circuitry, e.g., FPGA (field programmable gate array) or ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory, or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media, and memory devices, including by way of example semiconductor memory devices, e.g., EPROM, EEPROM, flash memory devices. The processor and the memory can be supplemented by, or incorporated into, special-purpose logic circuitry.

While this disclosure includes many specifics, these should not be construed as limitations on the scope of any invention or of what may be claimed, but rather as descriptions of features that may be specific to particular embodiments of particular inventions. Certain features that are described in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described herein should not be understood as requiring such separation in all embodiments.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the disclosed technology.

We claim:

1. A computer-implemented method for controlling access to an online session by detection of advanced user patterns, the method comprising:

collecting behavioral data of a user across windows and tabs of a browser of a user device running on or accessing a website;

determining a use of one or more of multiple browser tabs and windows of the website by associating a foreground process of the browser to a background process of the browser, wherein associating the foreground process of the browser to the background process comprises counting port accesses;

comparing the behavioral data and the use of the one or more of the multiple browser tabs and windows running on or accessed by the user device to normal use patterns and fraudulent use patterns; and authorizing the online session based on the comparing indicating a match with normal use patterns; or denying the online session based on the comparing indicating a match with one or more fraudulent use patterns.

2. The method of claim 1, wherein comparing the behavioral data and the use of the one or more of the multiple browser tabs and windows of the website to normal use patterns and fraudulent use patterns comprises determining whether a number of the one or more of the multiple browser tabs and windows is matched to a previously learned behavior of the user.

3. The method of claim 1, wherein comparing the behavioral data and the use of the one or more of the multiple browser tabs and windows of the website to normal use patterns and fraudulent use patterns comprises determining whether a number of the one or more of the multiple browser tabs and windows is matched to known fraudulent patterns.

4. The method of claim 1, further comprising correlating the behavioral data across one or more browsing contexts on a same user device.

5. The method of claim 4, further comprising attaching behavioral data on any browsing contexts on the same user device not submitted to a service provider to a next data submission from one or more browsing contexts to augment behavioral profiles with cross browsing-context data.

6. The method of claim 4 wherein the one or more browsing contexts comprise one or more of a tab, a window, a frame, and an iframe.

7. The method of claim 6, wherein the behavioral data across browsing contexts data previously submitted to a service provider from one or more browsing contexts is correlated to subsequently submitted behavioral data corresponding to other browsing contexts on the same user device.

8. The method of claim 1, wherein comparing the behavioral data and the use of the one or more of the multiple browser tabs and windows to normal use patterns and fraudulent use patterns further comprises comparing usage of the behavioral data to a normal usage population profile.

9. The method of claim 8, wherein the use of the one or more of the multiple browser tabs and windows indicates possible fraudulent user behavior comprising multiple new account openings or phishing attempts.

10. A computer-implemented method for enhanced detection of use of multiple browser tabs and windows of a same website running on or accessed by a user device, the method comprising:

tying a foreground process to a background process of an online session by using a BroadcastChannel interface to connect foreground and background processes and a sessionStorage property to store information about open views;

determining a number of simultaneous views of the same website open on a user device; and terminating the online session based on the number of simultaneous views being greater than a predetermined number.

11. The method of claim 10, further comprising matching a number of views open to a previously learned behavior of a user.

12. The method of claim 10, further comprising matching a number of views open to a number associated with suspected fraud.

13. The method of claim 10, wherein determining the number of simultaneous views comprises counting port accesses.

14. The method of claim 10, further comprising collecting behavioral data across windows and tabs of a browser of a user device accessing the same website.

15. The method of claim 14, further comprising correlating data already submitted to a service provider from one or more browsing contexts to any subsequently submitted data from other browsing contexts on the user device.

16. The method of claim 10, wherein the sessionStorage property is used in conjunction with the BroadcastChannel interface to simplify implementation.

17. A system configured to authorize or deny an online session, the system comprising:

a processor; and a memory having programming instructions stored thereon, which, when executed by the processor, cause the processor to perform a method of:

collecting behavioral data of a user across windows and tabs of a browser of a user device running on or accessing a website;

determining a use of one or more of multiple browser tabs and windows of the website running on or accessed by the user device by associating a foreground process of the browser to a background process of the browser, wherein associating the foreground process of the browser to the background process comprises counting port accesses;

comparing the behavioral data and the use of the one or more of multiple browser tabs and windows to normal use patterns and fraudulent use patterns; and authorizing the online session based on the compare indicating a match with normal use patterns; or denying the online session based on the compare indicating a match with one or more fraudulent use patterns.

18. The system of claim 17, wherein comparing the behavioral data and the use of the one or more of the multiple browser tabs and windows to normal use patterns and fraudulent use patterns comprises determining whether a number of the one or more of multiple browser tabs and windows is matched to a previously learned behavior of the user.

* * * * *